(12) United States Patent
Fu et al.

(10) Patent No.: US 11,288,454 B2
(45) Date of Patent: Mar. 29, 2022

(54) ARTICLE GENERATION

(71) Applicant: BEIJING SANKUAI ONLINE TECHNOLOGY CO., LTD, Beijing (CN)

(72) Inventors: Rao Fu, Beijing (CN); Juan Xu, Beijing (CN); Feiyi Wang, Beijing (CN); Peixu Hou, Beijing (CN); Zhian Yu, Beijing (CN); Biao Tang, Beijing (CN); Gong Zhang, Beijing (CN)

(73) Assignee: BEIJING SANKUAI ONLINE TECHNOLOGY CO., LTD, Beijing (CN)

( * ) Notice: Subject to any disclaimer, the term of this patent is extended or adjusted under 35 U.S.C. 154(b) by 0 days.

(21) Appl. No.: 17/097,405

(22) Filed: Nov. 13, 2020

(65) Prior Publication Data

US 2021/0064823 A1  Mar. 4, 2021

Related U.S. Application Data

(63) Continuation of application No. PCT/CN2018/121310, filed on Dec. 14, 2018.

(30) Foreign Application Priority Data

May 15, 2018 (CN) .......................... 201810462391.7

(51) Int. Cl.
*G06F 17/00* (2019.01)
*G06F 40/295* (2020.01)
(Continued)

(52) U.S. Cl.
CPC .......... *G06F 40/295* (2020.01); *G06F 40/186* (2020.01); *G06F 40/289* (2020.01); *G06F 40/30* (2020.01)

(58) Field of Classification Search
CPC ...... G06F 40/295; G06F 40/186; G06F 40/30; G06F 40/289; G06F 40/284; G06F 40/166
See application file for complete search history.

(56) References Cited

U.S. PATENT DOCUMENTS

| 6,356,864 B1 * | 3/2002 | Foltz ....................... G06F 40/30 704/1 |
| 8,265,925 B2 * | 9/2012 | Aarskog ................ G06F 40/211 704/9 |

(Continued)

FOREIGN PATENT DOCUMENTS

| CN | 106503255 A | * | 3/2017 |
| CN | 106503255 A | | 3/2017 |

(Continued)

OTHER PUBLICATIONS

International Search Report dated Mar. 13, 2019 corresponding to application No. PCT/CN2018/121310.

(Continued)

*Primary Examiner* — Laurie A Ries
(74) *Attorney, Agent, or Firm* — Nath, Goldberg & Meyer; Joshua B. Goldberg (57) ABSTRACT

An article generation method and device, and a computer storage medium. According to an example of the method, after a content source is mined based on requirement information inputted by a user, at least one topic dimension vector may be extracted from the mined content source by using a particular topic generation model. Then, for each extracted topic dimension vector, topic sentence mining is performed on the content source according to the topic dimension vector, to obtain topic sentences corresponding to the topic dimension vector. Finally, the topic sentences corresponding to the at least one topic dimension vector are (Continued)

spliced and synthesized, to generate an article conforming to the requirement information.

19 Claims, 5 Drawing Sheets

(51) Int. Cl.
*G06F 40/186* (2020.01)
*G06F 40/30* (2020.01)
*G06F 40/289* (2020.01)

(56) References Cited

U.S. PATENT DOCUMENTS

| | | | | |
|---|---|---|---|---|
| 9,047,283 | B1* | 6/2015 | Zhang | G06F 40/205 |
| 10,255,354 | B2* | 4/2019 | Markman | G06F 16/287 |
| 10,380,259 | B2* | 8/2019 | Lee | G06N 3/04 |
| 10,776,566 | B2* | 9/2020 | DeVries | G06F 40/284 |
| 2005/0143971 | A1* | 6/2005 | Burstein | G06F 40/253 |
| | | | | 704/4 |
| 2009/0187525 | A1* | 7/2009 | Agrawal | G16B 40/00 |
| | | | | 706/50 |
| 2010/0023311 | A1* | 1/2010 | Subrahmanian | G06F 40/30 |
| | | | | 704/2 |
| 2010/0128042 | A1* | 5/2010 | Confrey | G06T 11/60 |
| | | | | 345/473 |
| 2015/0106157 | A1* | 4/2015 | Chang | G06Q 30/0201 |
| | | | | 705/7.29 |
| 2015/0310096 | A1* | 10/2015 | Bao | G06F 16/367 |
| | | | | 707/738 |
| 2016/0034571 | A1* | 2/2016 | Setayesh | G06F 9/542 |
| | | | | 707/738 |
| 2017/0017722 | A1* | 1/2017 | Henderson | G06N 20/00 |
| 2017/0364586 | A1* | 12/2017 | Krishnamurthy | G06F 16/3329 |
| 2018/0160200 | A1* | 6/2018 | Goel | H04N 21/4532 |
| 2018/0336183 | A1* | 11/2018 | Lee | G06F 40/30 |
| 2019/0266288 | A1* | 8/2019 | Shukla | G06F 16/24578 |

FOREIGN PATENT DOCUMENTS

| | | |
|---|---|---|
| CN | 106663087 A | 5/2017 |
| CN | 106844322 A | 6/2017 |
| CN | 106933789 A | 7/2017 |
| CN | 106970898 A | 7/2017 |
| CN | 108694160 A | 10/2018 |
| WO | 2015106353 A1 | 7/2015 |

OTHER PUBLICATIONS

First Office Action Notice and Search Report dated Jan. 22, 2020 corresponding to Chinese application No. 201810462391.7.
Second Office Action Notice dated Jul. 16, 2020 corresponding to Chinese application No. 201810462391.7.
Basuki, et al. "Speech Generation for Humanoid Robot Interaction"; Knowledge Creation and Intelligent Computing (KCIC); 2016.
Li, et al. "A News Headline Generation Model Based on Attention Mechanism"; Journal of Shanxi University; 2017.

* cited by examiner

ARTICLE GENERATION

CROSS-REFERENCE TO RELATED APPLICATIONS

This is a By-Pass Continuation Application of National Phase. Patent Application No. PCT/CN2018/121310, filed Dec. 14, 2018, an application claiming the benefit from Chinese Application No. 201810462391.7, filed May 15, 2018, the contents of each of which are hereby incorporated by reference in their entirety.

TECHNICAL FIELD

The present invention relates to artificial intelligence technologies, and in particular, to an article generation method and device, and a computer storage medium.

BACKGROUND

With the continuous upgrading of user consumption, a low price is no longer the main factor determining user consumption, and users are more eager to obtain diversified information to support consumption decisions. Therefore, headline articles including diversified information have gradually become popular demand in major e-commerce and content platforms. At present, article publishing platforms mainly obtain articles in the following three manners: 1. manual editing; 2. crawling foreign sources to obtain headlines of articles; 3. generating through template splicing.

In addition, China Patent Publication No. CN106874248A discloses an article generation method and apparatus based on artificial intelligence. The method includes: selecting, after a template library is established in advance according to an article corpus, a target basic framework in a template library; then, in a preset database, performing searching according to an object described in each paragraph of the target basic framework and field related to each paragraph, to obtain field content corresponding to each object, and respectively filling the found corresponding field content in each paragraph position in the target basic framework, to obtain an article body; and finally, generating an article through splicing according to a target title of the article body and the article body, the target title being obtained through matching in a title library. Because the base framework is used for indicating, in an article of a corresponding type, an object described in each paragraph and a field related to each paragraph, so that an article can be automatically generated after the base framework is filled according to field content in a preset database.

SUMMARY

One of the objectives of the present invention is to implement automatic article writing based on user requirements.

According to a first aspect of the present invention, an article generation method is provided, including: mining a content source based on requirement information inputted by a user; extracting at least one topic dimension vector from the mined content source by using a particular topic generation model; performing, for each extracted topic dimension vector, topic sentence mining on the content source according to the topic dimension vector, to obtain topic sentences corresponding to the topic dimension vector; and splicing and synthesizing the topic sentences corresponding to the at least topic dimension vector, to generate an article conforming to the requirement information.

According to an implementation of the present invention, the mining a content source based on requirement information inputted by a user includes: parsing the requirement information to obtain an article description object and/or condition information; mining a point of interest (POI) matching the article description object and/or the condition information; and determining user generated content (UGC) corresponding to the POI as the content source.

According to an implementation of the present invention, the parsing the requirement information includes at least one of the following operations: performing word segmentation on the requirement information; performing part-of-speech analysis on the requirement information; performing named entity recognition on the requirement information; and performing semantic normalization processing on the requirement information.

According to an implementation of the present invention, the determining UGC corresponding to the POI as the content source includes: obtaining a user score of each POI in a plurality of POIs matching the article description object and/or the condition information; selecting, according to the user score of each POI, a target POI meeting a particular selection condition from the plurality of POIs; and determining UGC corresponding to the target POI as the content source.

According to an implementation of the present invention, the extracting at least one topic dimension vector from the content source by using a particular topic generation model includes: extracting, through the particular topic generation model, at least one topic description word from UGC included in the content source; and transforming the extracted topic description word into the at least one topic dimension vector through a first word vector transformation model.

According to an implementation of the present invention, the performing topic sentence mining on the content source according to the topic dimension vector, to obtain topic sentences corresponding to the topic dimension vector includes: performing a sentence segmentation and/or filtering operation on UGC in the content source, to obtain one or more candidate topic sentences corresponding to the topic dimension vector; calculating a cosine similarity between a sentence vector of each candidate topic sentence and the topic dimension vector; and determining a candidate topic sentence of which the calculated cosine similarity conforms to a threshold as a topic sentence corresponding to the topic dimension vector.

According to an implementation of the present invention, the calculating a cosine similarity between a sentence vector of each candidate topic sentence and the topic dimension vector includes: performing word segmentation processing on the candidate topic sentence to obtain a word segmentation result corresponding to the candidate topic sentence; transforming the word segmentation result into a sentence vector through a second word vector transformation model; and calculating a cosine similarity between the transformed sentence vector and the topic dimension vector.

According to an implementation of the present invention, the splicing and synthesizing the topic sentences corresponding to the at least one topic dimension vector includes: screening the topic sentences corresponding to each topic dimension vector according to a topic core word and/or a particular sentiment analysis algorithm; and splicing and synthesizing topic sentences reserved after the screening.

According to an implementation of the present invention, the screening the topic sentence corresponding to each topic dimension vector according to a topic core word includes: performing, for any topic sentence corresponding to the topic dimension vector, dependency semantic analysis on the topic sentence to obtain a target core word of the topic sentence; determining whether the topic core word of the topic sentence belongs to the topic dimension vector corresponding to the topic sentence; and reserving the topic sentence in a case that the topic core word of the topic sentence belongs to the topic dimension vector corresponding to the topic sentence; otherwise, filtering out the topic sentence.

According to an implementation of the present invention, the screening the topic sentences corresponding to each topic dimension vector according to a particular sentiment analysis algorithm includes: determining, for any topic sentence corresponding to the topic dimension vector, a sentiment tendency score of the topic sentence by using the particular sentiment analysis algorithm; determining whether sentiment of the topic sentence is positive according to the sentiment tendency score of the topic sentence; and reserving the topic sentence in a case that the sentiment of the topic sentence is positive; otherwise, filtering out the topic sentence.

According to an implementation of the present invention, the splicing and synthesizing the topic sentences corresponding to the at least one topic dimension vector includes: determining idea associations between the topic sentences and the corresponding topic dimension vector; selecting, according to the idea associations between the topic sentences and the corresponding topic dimension vector, a core topic sentence from the topic sentences corresponding to each topic dimension vector; and splicing and synthesizing the core topic sentences.

According to an implementation of the present invention, the determining idea associations between the topic sentences and the corresponding topic dimension vector includes: determining the idea associations between the topic sentences and the corresponding topic dimension vector through a recurrent neural network (RNN) and/or a TextRank algorithm.

According to an implementation of the present invention, before the splicing and synthesizing the topic sentences corresponding to each topic dimension vector, the method further includes: performing, by using match making rating (MMR), deduplication processing on the obtained topic sentences corresponding to each topic dimension vector.

According to an implementation of the present invention, the method further includes: selecting image information correlated with the at least one topic dimension vector from a particular image library; and fusing the image information and the generated article to form an image-text mixed article.

According to an implementation of the present invention, the method further includes: searching for a particular object attribute and/or sentence corpus matching content of the generated article or the requirement information; and generating an article title according to a particular template rule by using the found particular object attribute and/or sentence corpus.

According to a second aspect of the present invention, an article generation device is provided, including: a content source mining apparatus, configured to mine a content source based on requirement information inputted by a user; a topic dimension vector extraction apparatus, configured to extract at least one topic dimension vector from the mined content source by using a particular topic generation model; a topic sentence mining apparatus, configured to perform, for each extracted topic dimension vector, topic sentence mining on the content source according to the topic dimension vector, to obtain topic sentences corresponding to the topic dimension vector; and a topic sentence splicing and generation apparatus, configured to splice and synthesize the topic sentences corresponding to the at least topic dimension vector, to generate an article conforming to the requirement information.

According to an implementation of the present invention, the content source mining apparatus includes: a parsing module, configured to parse the requirement information to obtain an article description object and/or condition information; a mining module, configured to mine a POI matching the article description object and/or the condition information; and a determining module, configured to determine UGC corresponding to the POI as the content source.

According to an implementation of the present invention, when parsing the requirement information, the parsing module performs at least one of the following operations: performing word segmentation on the requirement information; performing part-of-speech analysis on the requirement information; performing named entity recognition on the requirement information; and performing semantic normalization processing on the requirement information.

According to an implementation of the present invention, the determining module is further configured to: obtain, after the mining module mines a plurality of POIs matching the article description object and/or the condition information, a user score of each POI in the plurality of POIs; select, according to the user score of each POI, a target POI meeting a particular selection condition from the plurality of POIs; and determine UGC corresponding to the target POI as the content source.

According to an implementation of the present invention, the topic dimension vector extraction apparatus includes: an extraction module, configured to extract, through the particular topic generation model, at least one topic description word from UGC included in the content source; and a transforming module, configured to transform the extracted topic description word into the at least one topic dimension vector through a first word vector transformation model.

According to an implementation of the present invention, the topic sentence mining apparatus includes: a sentence segmentation processing module, configured to perform a sentence segmentation and/or filtering operation on UGC in the content source, to obtain one or more candidate topic sentences corresponding to the topic dimension vector; a calculation module, configured to calculate a cosine similarity between a sentence vector of each candidate topic sentence and the topic dimension vector; and a judgment module, configured to determine a candidate topic sentence of which the calculated cosine similarity conforms to a particular threshold as a topic sentence corresponding to the topic dimension vector.

According to an implementation of the present invention, the calculation module is further configured to: perform word segmentation processing for the candidate topic sentence to obtain a word segmentation result corresponding to the candidate topic sentence; transform the word segmentation result into a sentence vector through a second word vector transformation model; and calculate a cosine similarity between the transformed sentence vector and the topic dimension vector.

According to an implementation of the present invention, the device further includes a topic sentence screening apparatus, where the topic sentence screening apparatus is configured to screen the topic sentences corresponding to each topic dimension vector according to a topic core word and/or a particular sentiment analysis algorithm before the topic sentence splicing and generation apparatus splices and synthesizes the topic sentences corresponding to each topic dimension vector.

According to an implementation of the present invention, the topic sentence screening apparatus is configured to perform, for any topic sentence corresponding to the topic dimension vector, dependency semantic analysis on the topic sentence to obtain a target core word of the topic sentence; determine whether the topic core word of the topic sentence belongs to the topic dimension vector corresponding to the topic sentence; and reserve the topic sentence in a case that the topic core word of the topic sentence belongs to the topic dimension vector corresponding to the topic sentence; otherwise, filter out the topic sentence.

According to an implementation of the present invention, the topic sentence screening apparatus is configured to determine, for any topic sentence corresponding to the topic dimension vector, a sentiment tendency score of the topic sentence by using the particular sentiment analysis algorithm; determine whether sentiment of the topic sentence is positive according to the sentiment tendency score of the topic sentence; and reserve the topic sentence in a case that the sentiment of the topic sentence is positive; otherwise, filter out the topic sentence.

According to an implementation of the present invention, the topic sentence splicing and generation apparatus is further configured to determine, before the topic sentences corresponding to each topic dimension vector are spliced and synthesized, idea associations between the topic sentences and the corresponding topic dimension vector; select, according to the idea associations between the topic sentences and the corresponding topic dimension vector, a core topic sentence from the topic sentences corresponding to each topic dimension vector; and splice and synthesize the core topic sentences.

According to an implementation of the present invention, the topic sentence splicing and generation apparatus is further configured to determine the idea associations between the topic sentence and a corresponding topic dimension vector through an RNN and/or a TextRank algorithm.

According to an implementation of the present invention, the topic sentence splicing and generation apparatus is further configured to perform, by using an MMR method, deduplication processing on the obtained topic sentences corresponding to each topic dimension vector before the topic sentences corresponding to each topic dimension vector are spliced and synthesized.

According to an implementation of the present invention, the device further includes an image-text fusion apparatus, configured to select image information correlated with the at least one topic dimension vector from a particular image library; and fuse the image information and the generated article to form an image-text mixed article.

According to an implementation of the present invention, the device further includes an article title generation apparatus, configured to search for a particular object attribute and/or sentence corpus matching content of the generated article or the requirement information; and generate an article title according to a particular template rule by using the found particular object attribute and/or sentence corpus.

According to a third aspect of the present invention, an article generation device is provided, including: one or more processors; a memory; and a program stored in the memory, the program, when executed by the one or more processors, causing the one or more processors to perform the foregoing method.

According to a fourth aspect of the present invention, a computer-readable storage medium is provided, storing a program, the program, when executed by a processor, causing the processor to perform the foregoing method.

By mining a content source based on requirement information inputted by a user, obtaining article content strongly associated with user requirements from the mined content source, and generating an article conforming to the requirement information, the embodiments of the present disclosure effectively implement automatic article writing based on the user requirements, and article generation has a short cycle, low costs, and excellent quality.

It should be understood that the teachings of the present invention do not need to achieve all the foregoing beneficial effects, but a specific technical solution can achieve a specific technical effect, and other implementations of the present invention can also achieve beneficial effects that are not mentioned above.

BRIEF DESCRIPTION OF THE DRAWINGS

The foregoing and other purposes, characteristics, and advantages of the exemplary implementations of the present invention become easy to understand according to the detailed description below with reference to accompanying drawings. In the accompanying drawings, several implementations of the present invention are shown in an exemplary rather than restrictive manner.

In the accompanying drawings, same or corresponding reference numerals represent same or corresponding parts.

DESCRIPTION OF THE EMBODIMENTS

The principles and spirit of the present invention are described below with reference to several exemplary implementations. It should be understood that the embodiments are provided to allow a person skilled in the art to better understand and thus implement the present invention, but not to limit the scope of the present invention in any manner. On the contrary, the implementations are provided to make the present invention more thorough and complete, and the scope of the present invention can be fully conveyed to a person skilled in the art.

The following describes the specific implementations of the present invention in detail with reference to the accompanying drawings.

Figure 1:
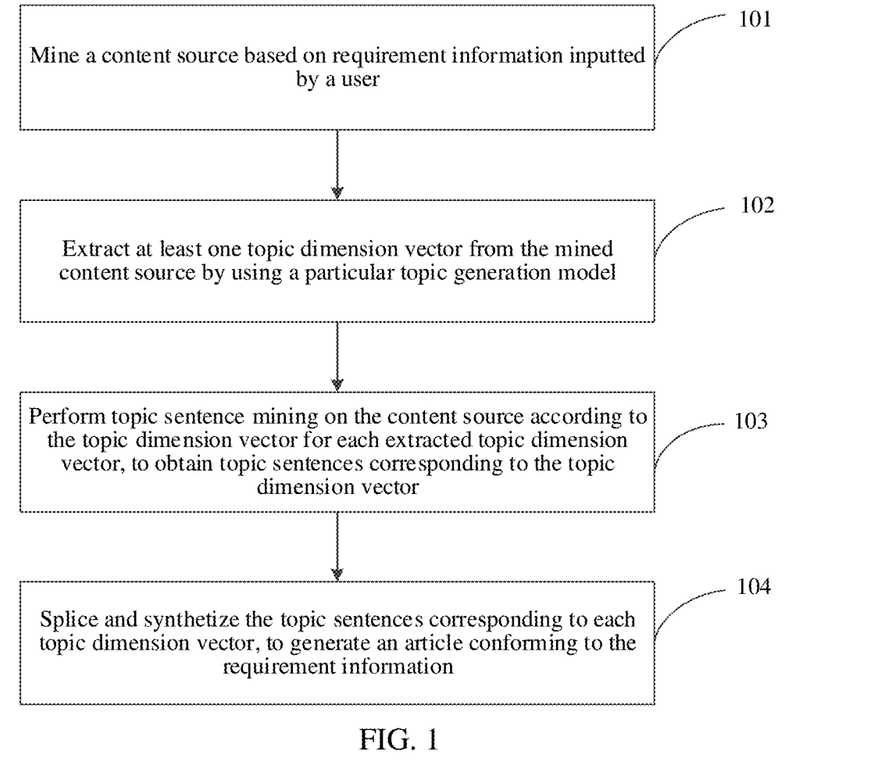
FIG. 1 is a flowchart of an article generation method according to an embodiment of the present invention.

FIG. 1 is a flowchart of an article generation method according to an embodiment of the present invention. As shown in FIG. 1, the method includes the following operations:

Operation 101: Mine a content source based on requirement information inputted by a user.

Operation 102: Extract at least one topic dimension vector from the mined content source by using a particular topic generation model.

Operation 103: Perform, for each extracted topic dimension vector, topic sentence mining on the content source according to the topic dimension vector, to obtain topic sentences corresponding to the topic dimension vector.

Operation 104: Splice and synthesize the topic sentences corresponding to the at least one topic dimension vector, to generate an article conforming to the requirement information.

In the process of generating an article meeting a user requirement, a user only needs to input the requirement information to a terminal, so that the terminal automatically perform operations 101 to 104 in response to the requirement information inputted by the user.

The terminal may be a fixed electronic device such as a personal computer (PC), a portable electronic device such as a personal digital assistant (PDA), a handheld computer, or a tablet computer, and certainly may further be a smart mobile device such as a smartphone.

The following first describes operation 101 in detail performed by the terminal in response to the requirement information inputted by the user.

Figure 2:
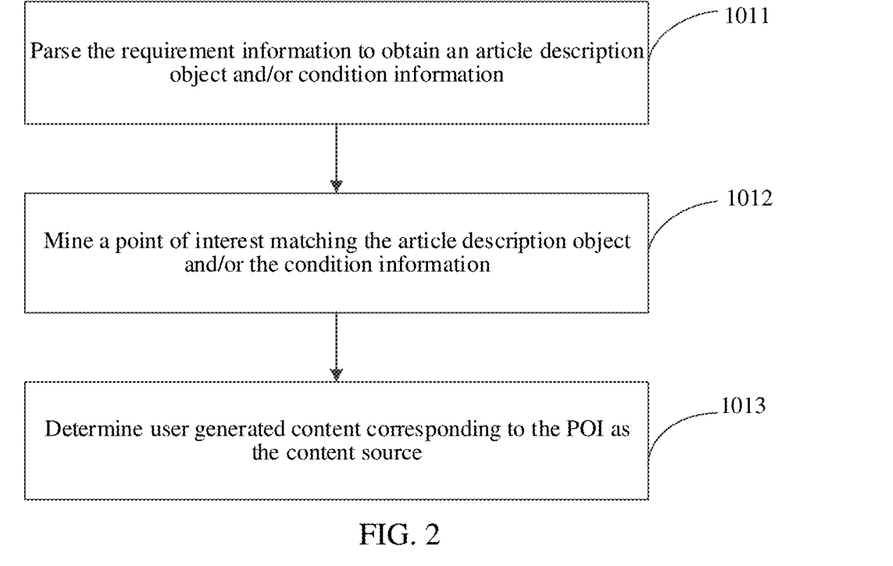
FIG. 2 is an implementation flowchart of mining a content source based on requirement information inputted by a user according to an embodiment of the present invention.

FIG. 2 is an implementation flowchart of mining a content source based on requirement information inputted by a user according to an embodiment of the present invention. As shown in FIG. 2, in an possible implementation of the present invention, the mining a content source based on requirement information inputted by a user includes the following operations: operation 1011, parsing the requirement information to obtain an article description object and/or condition information; operation 1012: mining a POI matching the article description object and/or the condition information; and operation 1013: determining UGC corresponding to the POI as the content source.

It should be understood that the requirement information is information in any form inputted by the user. For example, the requirement information may include information in the form of different combinations of types such as a brand name, a merchant name, a recommended dish, and a geographical location. Certainly, in a specific application, the requirement information inputted by the user into the terminal generally may include only information about types such as an addresses, a category, and a brand in which users are interested, for example, "Jingan Temple Haidilao"; or may include information used for additionally describing the types such as an address, a category, and a brand, for example, "delicious hot pot restaurant near Zhongshan Park".

The parsing the requirement information in operation 1011 may include at least one of the following operations: performing word segmentation on the requirement information; performing part-of-speech analysis on the requirement information; performing named entity recognition on the requirement information; and performing semantic normalization processing on the requirement information.

It may be understood by a person skilled in the art that in the process of parsing the requirement information, some or all the operations described above may be selectively performed based on the information in different forms inputted by the user. In addition, in the process of parsing to obtain an article description object and/or condition information, information matching is performed with an offline mined and stored lexicon including a large amount of data, to search for key information about a brand name, a merchant name, a recommended dish, a geographical location and the like. For example, for "delicious hot pot restaurant near Zhongshan Park" inputted by the user, an article description object of a category word "hot pot" may be obtained through parsing, and condition information about a geographical location "Zhongshan Park" may also be obtained at the same time.

In a specific implementation process of operations 1012 to 1013, one or more POIs matching the article description object and/or the condition information may be mined in a manner of comparison with the lexicon. In a case that one POI is mined, UGC corresponding to the POI may be directly determined as the content source. For example, through matching with the lexicon, it may be determined that "Fenjia Liuzhou river snails rice noodles" is a popular merchant. Therefore, user comments on the popular merchant may be directly determined as the content source for subsequent content mining In a case that a plurality of POIs are mined, the plurality of POIs may be screened preferentially, to lay the foundation for subsequently generating an article with a high association.

According to a possible implementation of the present invention, after the plurality of POIs matching the article description object and/or the condition information are mined, and before UGC that is in a content information library and that corresponds to the POI is determined as a content source, the method further includes: obtaining a user score of each POI in the plurality of POIs; and selecting, according to the user score of each POI, a target POI meeting a particular selection condition from the plurality of POIs. In addition, the determining UGC corresponding to the POI as the content source includes: determining UGC corresponding to the target POI as the content source.

In an example, using a user requirement "2017 popular art movies" as an example, three POIs including "Youth", "Paths of the Soul", and "Seventy-Seven days" are mined, and user scores are 8.6, 7.5, and 7.3 respectively. Further, "Youth" meeting a condition "highest score" may be selected from the three POIs as a target POI, to determine UGC corresponding to "Youth" as a content source.

The foregoing describes the implementation process of mining a content source based on the requirement information inputted by the user in operation 101 in detail, to provide a high-quality content source for subsequent article generation. The following describes, through specific implementations in operations 102 to 104, how to obtain article content strongly associated with a user requirement from the content source in detail.

In operation 102, the extracting at least one topic dimension vector from the content source by using a particular topic generation model includes: extracting, through the particular topic generation model, at least one topic description word from UGC included in the content source; and transforming the extracted topic description word into the at least one topic dimension vector through a first word vector transformation model.

Specifically, the at least one topic description word may be extracted from the UGC (for example, an article title and/or a corpus) included in the content source through a particular topic generation model in which term frequency (TF) is combined with latent dirichlet allocation (LDA). It should be understood by a person skilled in the art that in a technical implementation of searching for topic description words in a manner of combining the TF and the LDA, topic description words including, but not limited to: price, environment, service, and the like of a general topic dimension vector may be extracted by invoking a manually built general topic repository.

Figure 3:
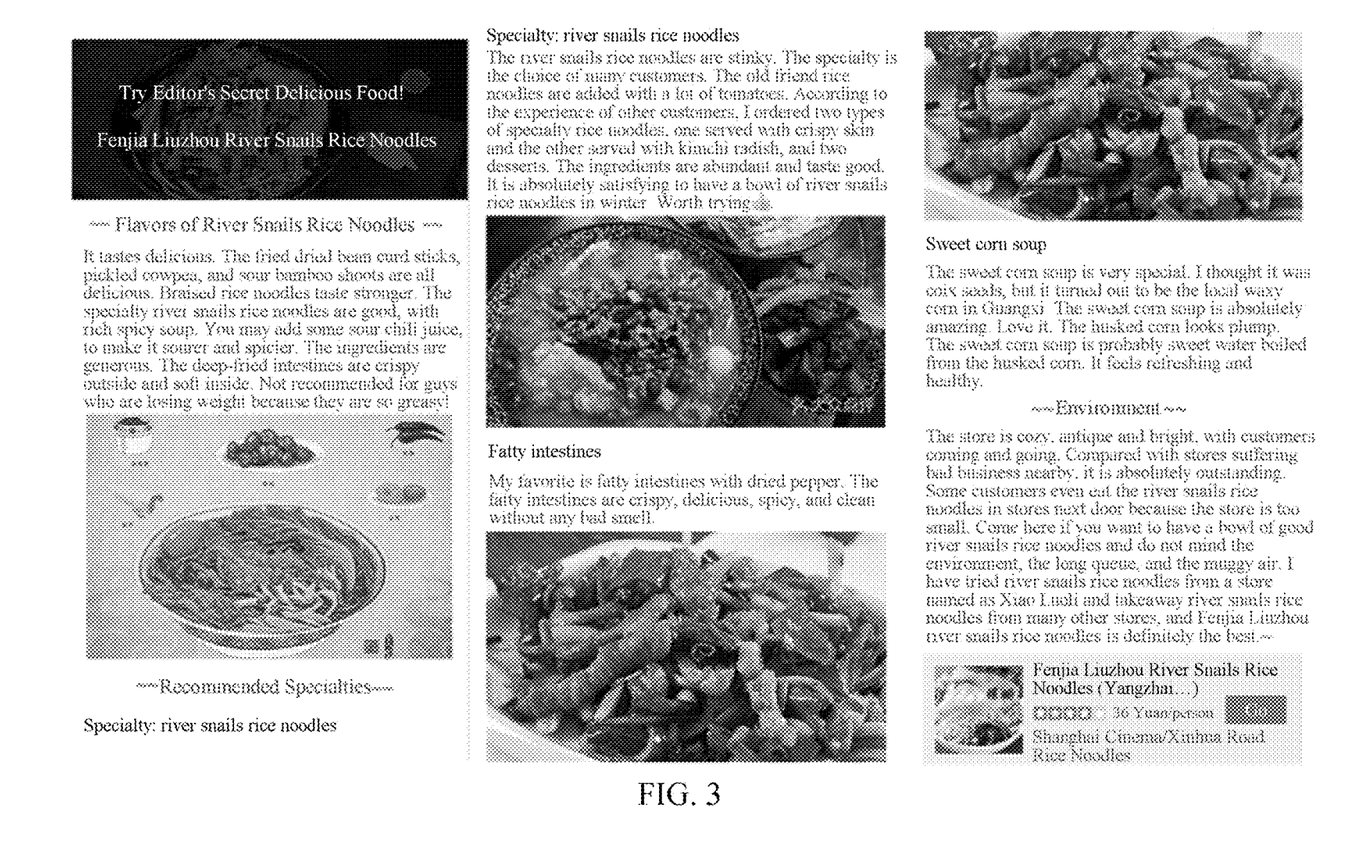
FIG. 3 is a display effect diagram of an article generated based on artificial intelligence with "Fenjia Liuzhou river snails rice noodles" as an example according to an exemplary embodiment of the present invention.

Further, after the at least one topic description word is extracted, the extracted topic description word may be transformed into at least one topic dimension vector by using a word2vec model. The at least one topic dimension vector includes at least the following two types: a general topic dimension vector and a special topic dimension vector. For example, topic dimensions such as "service", "flavor", "location", "cat", "parfait", and "environment" may be mined from a coffee shop. The "service", "price", and "environment" are general topic dimensions, and the "cat" and "parfait" are special topic dimensions of the coffee shop (because the coffee shop has pets and the parfait is a popular dessert). Using "FenJia Liuzhou river snails rice noodles" as another example, as shown in FIG. 3, general topic dimensions of the merchant are also "service", "flavor", "environment", and the like, but mined special topic dimensions of the merchant may be "river snails rice noodles", "fatty intestine", "sweet corn soup" and the like.

In operation 103, the performing topic sentence mining on the content source according to the topic dimension vector, to obtain topic sentences corresponding to the topic dimension vector may include: performing a sentence segmentation and/or filtering operation on UGC in the content source, to obtain one or more candidate topic sentences corresponding to the topic dimension vector; calculating a cosine similarity between a sentence vector of each candidate topic sentence and the topic dimension vector; and using a candidate topic sentence of which the calculated cosine similarity conforms to a threshold as a topic sentence corresponding to the topic dimension vector.

According to a possible implementation of the present invention, the calculating a cosine similarity between a sentence vector of each candidate topic sentence and the topic dimension vector includes: performing word segmentation processing on the candidate topic sentence to obtain a word segmentation result corresponding to the candidate topic sentence; transforming the word segmentation result into a sentence vector through a second word vector transformation model; and calculating a cosine similarity between the transformed sentence vector and the topic dimension vector.

Specifically, the word segmentation processing is first performed on the candidate topic sentence after the sentence segmentation and/or filtering operation is performed on the UGC; the word segmentation processing result is transformed into a sentence vector by using a word2vec model; and then a cosine similarity between the sentence vector and the topic dimension vector is calculated, to obtain a topic sentence corresponding to the topic dimension vector, thereby implementing matching between the topic dimension vector and the topic sentence. It should be understood by a person skilled in the art that the second word vector transformation model and the first word vector transformation model described above may be both the word2vec model, and belong to opposite transformation processes in the word2vec model.

It should be understood that the topic sentences corresponding to each topic dimension vector which are obtained in operations 102 and 103 may include positive content information correlated with the user requirement, or may include negative information correlated with the user requirement. Analysis is made based on the user requirement. To achieve a positive publicity effect, because article content that users expect to be displayed should be positive, before the topic sentences corresponding to the topic dimension vector are spliced and synthesized, the method needs to further include the following operation: screening the topic sentences corresponding to each topic dimension vector according to a topic core word and/or a particular sentiment analysis algorithm.

According to a possible implementation of the present invention, the screening the topic sentences corresponding to each topic dimension vector according to a topic core word includes: performing, for any topic sentence corresponding to each topic dimension vector, dependency semantic analysis on the topic sentence to obtain a target core word of the topic sentence; determining whether the topic core word of the topic sentence belongs to the topic dimension vector corresponding to the topic sentence; and reserving the topic sentence in a case that the topic core word of the topic sentence belongs to the topic dimension vector corresponding to the topic sentence; otherwise, filtering out the topic sentence. For example, a topic core word of a sentence is "flavor shrimp", which obviously does not belong to the topic dimension vector "flavor" corresponding to the sentence, but only includes the word "flavor". Therefore, "flavor shrimp" may be filtered out by using the dependency semantic analysis.

According to a possible implementation of the present invention, the screening the topic sentences corresponding to each topic dimension vector according to a particular sentiment analysis algorithm includes: determining, for any topic sentence corresponding to each topic dimension vector, a sentiment tendency score of the topic sentence by using the particular sentiment analysis algorithm; determining whether sentiment of the topic sentence is positive according to the sentiment tendency score of the topic sentence; and reserving the topic sentence in a case that the sentiment of the topic sentence is positive; otherwise, filtering out the topic sentence. Specifically, a positive topic sentence may be directly reserved after the sentiment tendency scores of the topic sentences are obtained by using a method that combines traditional sentiment analysis (which determines whether a sentence includes a negative word) with deep learning sentiment analysis (for example, a BiLSTM algorithm that determines a sentiment tendency with reference to a word order).

According to a possible implementation of the present invention, before the splicing and synthesizing the topic sentences corresponding to the topic dimension vector, the method further includes: determining idea associations between the topic sentences and the corresponding topic dimension vector; selecting, according to the idea associations between the topic sentences and the corresponding topic dimension vector, a core topic sentence from the topic sentences corresponding to each topic dimension vector; and splicing and synthesizing the core topic sentences. Specifically, the idea associations between the topic sentences and the corresponding topic dimension vector may be determined through an RNN and/or TextRank.

Further, deduplication processing is performed on the obtained topic sentences corresponding to each topic dimension vector by using MMR. That is, similarities of candidate topic sentences under each topic dimension are determined by using the MMR method, to obtain topic sentences with small similarities and large information coverage under each topic dimension.

Finally, the topic sentences corresponding to the topic dimension vector are spliced and synthesized, to generate an article conforming to the requirement information. Using "FenJia Liuzhou river snails rice noodles" as an example, as shown in FIG. 3, article content corresponding to the general topic dimension "flavor" of the merchant is "It tastes delicious. The fried dried bean curd sticks, pickled cowpea, and sour bamboo shoots are all delicious. Braised rice noodles taste stronger. The specialty river snails rice noodles are good, with rich spicy soup. You may add some sour chili juice, to make it sourer and spicier. The ingredients are generous. The deep-fried intestines are crispy outside and soft inside. Not recommended for guys who are losing weight because they are so greasy!" In addition, it may be learned from FIG. 3 that the generated article further includes article content corresponding to the general topic dimension "environment" of the merchant, and article content respectively corresponding to "river snails rice noodles", "fatty intestines" and "sweet corn soup" under the special topic dimension "recommended specialties" of the merchant. Article content of each topic dimension vector is not described in detail herein.

In practical application, to enhance the readability of the generated article and improve the visual perception of users, in the process of generating the article, some image information correlated with the user requirement may be added, to generate an article including image information.

According to an implementation of the present invention, the method further includes: selecting image information correlated with the at least one topic dimension vector from a particular image library; and fusing the image information and the generated article to form an image-text mixed article. Specifically, after the at least one topic dimension vector is mined in operation 102, image information correlated with the at least one topic dimension vector may be selected from an image repository. Still using "FenJia Liuzhou river snails rice noodles" as an example, as shown in FIG. 3, the generated article includes images corresponding to the general topic dimensions "flavor" and "environment" of the merchant, and images corresponding to "river snails rice noodles", "fatty intestines" and "sweet corn soup" under the special topic dimension "recommended specialties" of the merchant.

According to an implementation of the present invention, the method further includes: searching for a particular object attribute and/or sentence corpus matching content of the generated article or the requirement information; and generating an article title according to a particular template rule by using the found particular object attribute and/or sentence corpus. For example, for a brand of a hot pot category, an article title "Word-Famous Hot Pot! Have a Try?" may be generated based on the particular template rule. Using the merchant "Fenjia Liuzhou river snails rice noodles" as an example again, as shown in FIG. 3, an article title such as "Try Editor's Secret Delicious Food! Fenjia Liuzhou river snails rice noodles" is automatically generated based on a particular template rule including a food category and a merchant having a clear brand name, for example, "Try Editor's Secret Delicious Food! XXXX".

Figure 4:
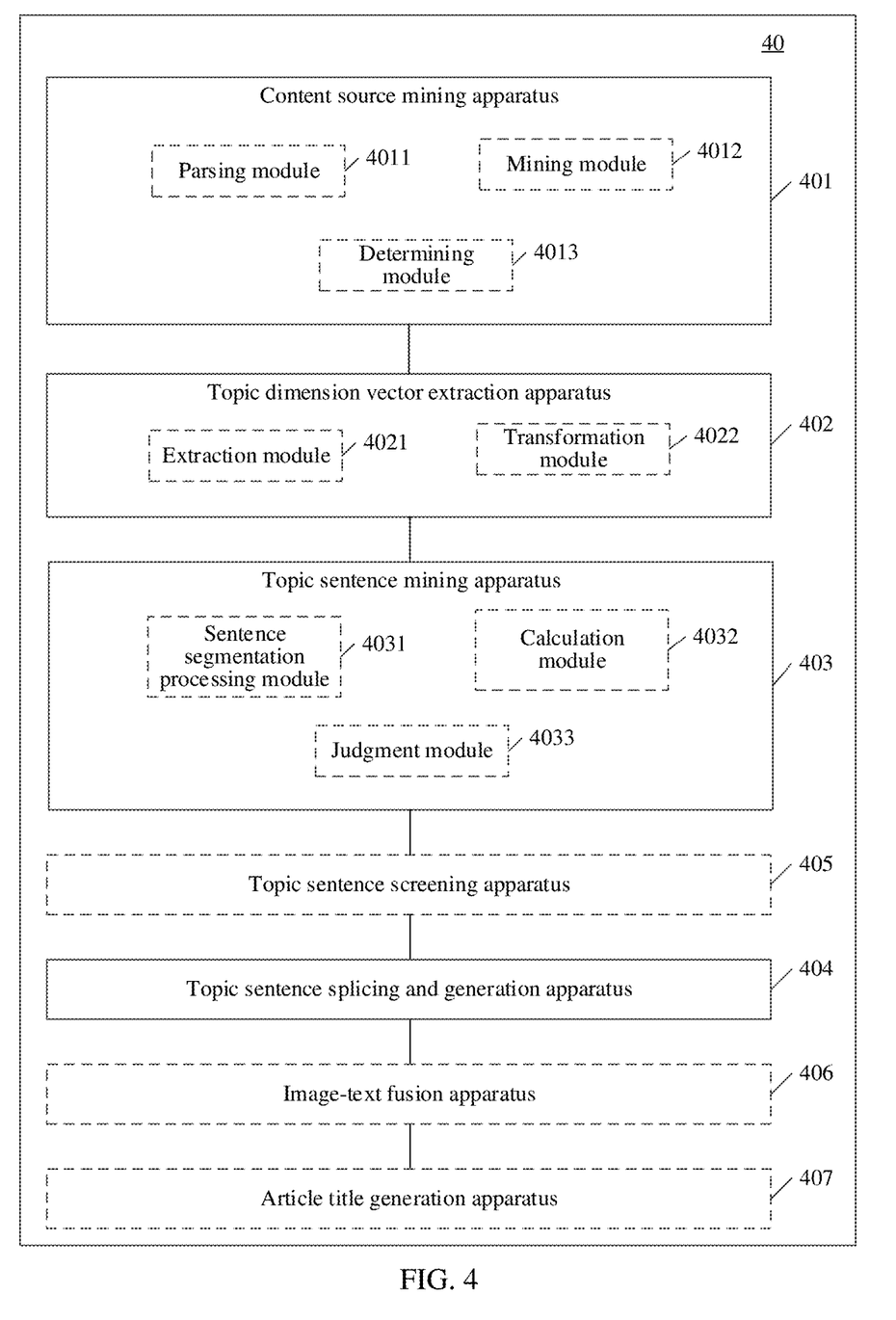
FIG. 4 is a composition schematic structural diagram of an article generation device according to an embodiment of the present invention.

FIG. 4 is a composition schematic structural diagram of an article generation device according to an embodiment of the present invention.

As shown in FIG. 4, the article generation device 40 includes: a content source mining apparatus 401, configured to mine a content source based on requirement information inputted by a user; a topic dimension vector extraction apparatus 402, configured to extract at least one topic dimension vector from the mined content source by using a particular topic generation model; a topic sentence mining apparatus 403, configured to perform, for each extracted topic dimension vector, topic sentence mining on the content source according to the topic dimension vector, to obtain topic sentences corresponding to the topic dimension vector; and a topic sentence splicing and generation apparatus 404, configured to splice and synthesize the topic sentences corresponding to the at least topic dimension vector, to generate an article conforming to the requirement information.

According to an implementation of the present invention, as shown in FIG. 4, the content source mining apparatus 401 includes: a parsing module 4011, configured to parse the requirement information to obtain an article description object and/or condition information; a mining module 4012, configured to mine a POI matching the article description object and/or the condition information; and a determining module 4013, configured to determine UGC corresponding to the POI as the content source.

According to an implementation of the present invention, when parsing the requirement information, the parsing module 4011 performs at least one of the following operations: performing word segmentation on the requirement information; performing part-of-speech analysis on the requirement information; performing named entity recognition on the requirement information; and performing semantic normalization processing on the requirement information.

According to an implementation of the present invention, there may be a plurality of POIs matching the article description object and/or the condition information. In such a case, when determining the UGC corresponding to the POI as the content source, the determining module 4013 is further configured to: obtain a user score of each POI in a plurality of POIs matching the article description object and/or the condition information; select, according to the user score of each POI, a target POI meeting a particular selection condition from the plurality of POIs; and determining UGC corresponding to the target POI as the content source.

According to an implementation of the present invention, as shown in FIG. 4, the topic dimension vector extraction apparatus 402 includes: an extraction module 4021, configured to extract, through the particular topic generation model, at least one topic description word from UGC included in the content source; and a transforming module 4022, configured to transform the extracted topic description word into the at least one topic dimension vector through a first word vector transformation model.

According to an implementation of the present invention, as shown in FIG. 4, the topic sentence mining apparatus 403 includes: a sentence segmentation processing module 4031, configured to perform a sentence segmentation and/or filtering operation on UGC in the content source, to obtain one or more candidate topic sentences corresponding to the topic dimension vector; a calculation module 4032, configured to calculate a cosine similarity between a sentence vector of each candidate topic sentence and the topic dimension vector; and a determining module 4033, configured to determine a candidate topic sentence of which the calculated cosine similarity conforms to a particular threshold as a topic sentence corresponding to the topic dimension vector.

According to an implementation of the present invention, the calculation module 4032 is further configured to: perform word segmentation processing for the candidate topic sentence to obtain a word segmentation result corresponding to the candidate topic sentence; transform the word segmentation result into a sentence vector through a second word vector transformation model; and calculate a cosine similarity between the transformed sentence vector and the topic dimension vector.

According to an implementation of the present invention, as shown in FIG. 4, the device further includes a topic sentence screening apparatus 405. The topic sentence screening apparatus 405 is configured to: before the topic sentence splicing and generation apparatus 404 splices and synthesizes the topic sentences corresponding to the at least one topic dimension vector, screen the topic sentences corresponding to each topic dimension vector according to a topic core word and/or a particular sentiment analysis algorithm, so that the topic sentence splicing and generation apparatus 404 splices and synthesizes the topic sentences that are reserved after the screening.

According to an implementation of the present invention, when screening the topic sentences corresponding to the topic dimension vector according to the topic core word, the topic sentence screening apparatus 405 is configured to: perform, for any topic sentence corresponding to the topic dimension vector, dependency semantic analysis on the topic sentence to obtain a target core word of the topic sentence; determine whether the topic core word of the topic sentence belongs to the topic dimension vector corresponding to the topic sentence; and reserve the topic sentence in a case that the topic core word of the topic sentence belongs to the topic dimension vector corresponding to the topic sentence; otherwise, filter out the topic sentence. According to an implementation of the present invention, when screening the topic sentences corresponding to each topic dimension vector according to the particular sentiment analysis algorithm, the topic sentence screening apparatus 405 is configured to: determine, for any topic sentence corresponding to each topic dimension vector, a sentiment tendency score of the topic sentence by using the particular sentiment analysis algorithm; determine whether sentiment of the topic sentence is positive according to the sentiment tendency score of the topic sentence; and reserve the topic sentence in a case that the sentiment of the topic sentence is positive; otherwise, filter out the topic sentence.

According to an implementation of the present invention, the topic sentence splicing and generation apparatus 404 is further configured to: before the topic sentences corresponding to each topic dimension vector are spliced and synthesized, determine idea associations between the topic sentences and the corresponding topic dimension vector; select, according to the idea associations between the topic sentences and the corresponding topic dimension vector, a core topic sentence from the topic sentences corresponding to the topic dimension vector; and splice and synthesize the core topic sentences.

According to an implementation of the present invention, the topic sentence splicing and generation apparatus 404 is further configured to determine the idea associations between the topic sentences and the corresponding topic dimension vector through an RNN and/or a TextRank algorithm.

According to an implementation of the present invention, the topic sentence splicing and generation apparatus 404 is further configured to perform, by using MMR, deduplication processing on the obtained topic sentences corresponding to each topic dimension vector before the topic sentences corresponding to each topic dimension vector are spliced and synthesized.

According to an implementation of the present invention, as shown in FIG. 4, the device further includes an image-text fusion apparatus 406. The image-text fusion apparatus 406 is configured to select image information correlated with the at least one topic dimension vector from a particular image library; and fuse the image information and the generated article to form an image-text mixed article.

According to an implementation of the present invention, as shown in FIG. 4, the device further includes an article title generation apparatus 407. The article title generation apparatus 407 is configured to search for a particular object attribute and/or sentence corpus matching content of the generated article or the requirement information; and generate an article title according to a particular template rule by using the found particular object attribute and/or sentence corpus.

It needs to be noted herein that the foregoing description in the device embodiment is similar to the description of the foregoing method. Beneficial effects the same as those of the method are not described again. For technical details not disclosed in the device embodiment of the present invention, refer to the description of the method embodiment of the present invention.

Exemplary Device

After the method and device according to the implementations of the present invention are described, next, an article generation device according to another exemplary implementation of the present invention is described.

It may be understood by a person skilled in the technical field that each aspect of the present invention may be implemented as a system, a method, or a program product. Therefore, each aspect of the present invention can be specifically implemented in the following manners, that is, a hardware-only implementation, a software-only implementation (including firmware, microcode, and the like), or an implementation combining hardware and software, which can be collectively referred to as a "circuit", "module" or "system" herein.

In some possible implementations, the article generation device in the present invention may include at least one or more processors, and at least one memory. The memory stores programs, the programs, when executed by the processors, causing the processors to perform each operation described in the specification. For example, the processors may perform the operations shown in FIG. 1, including: operation 101, mining a content source based on requirement information inputted by a user; operation 102, extracting at least one topic dimension vector from the mined content source by using a particular topic generation model; operation 103, performing, for each extracted topic dimension vector, topic sentence mining on the content source according to the topic dimension vector, to obtain topic sentences corresponding to the topic dimension vector; and operation 104, splicing and synthesizing the topic sentences corresponding to the at least one topic dimension vector, to generate an article conforming to the requirement information.

Figure 5:
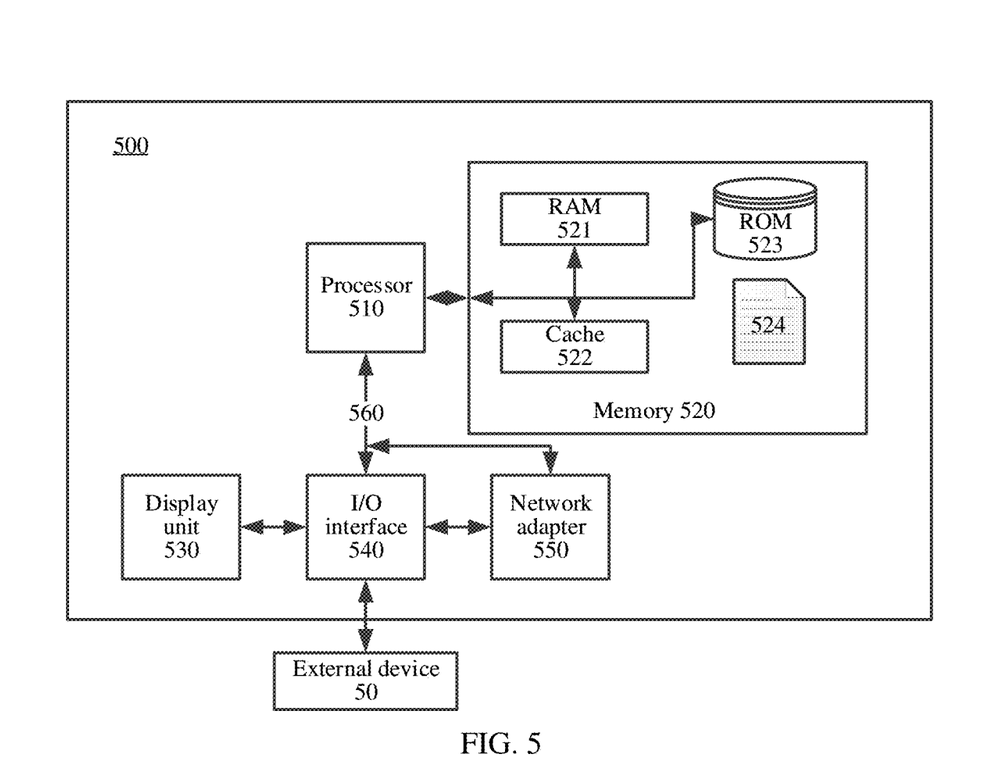
FIG. 5 is a schematic diagram of an article generation device according to an implementation of the present invention.

FIG. 5 is a schematic diagram of an article generation device according to an implementation of the present invention.

The article generation device according to this implementation of the present invention is described with reference to FIG. 5 below. The device 500 shown in FIG. 5 is only an example, and should not impose any limitation on the functions and scope of use of the embodiments of the present invention.

As shown in FIG. 5, the device 500 is represented in the form of a general-purpose computing device, including but not limited to: at least one processor 510, at least one memory 520, and a bus 560 connecting different system components (including the memory 520 and the processor 510).

The bus 560 includes an address bus, a control bus, and a data bus.

The memory 520 may include a volatile memory, such as a random access memory (RAM) 521 and/or a cache memory 522, and may further include a read-only memory (ROM) 523.

The memory 520 may further include a set of (at least one) program modules 524. The program modules 524 include, but are not limited to an operating system, one or more applications, another program module, and program data. Each of such examples or a combination thereof may include an implementation of a network environment.

The device 500 may further communicate with one or more external devices 50 (for example, a keyboard, a pointing device, and a Bluetooth device). Such communication may be performed through an input/output (I/O) interface 540 and displayed on a display unit 530. In addition, the device 500 may further communicate with one or more networks (for example, a local area network (LAN), a wide area network (WAN), and/or a public network such as the Internet) through a network adapter 550. As shown in FIG. 5, the network adapter 550 communicates with other modules in the device 500 by using the bus 560. It should understood that although not shown in the figure, other hardware and/or software modules may be used in combination with the electronic device 500, including, but not limited to microcode, a device drive, a redundancy processing unit, an external disk drive array, a RAID system, a tape drive, a data backup storage system, or the like.

Exemplary Computer-Readable Storage Medium

In some possible implementations, each aspect of the present invention may be implemented in the form of a computer-readable storage medium, including program code, the program code, when executed by a processor, causing the processor to perform the operations of the foregoing method. For example, the processor may perform the operations shown in FIG. 1, including: operation 101, mining a content source based on requirement information inputted by a user; operation 102, extracting at least one topic dimension vector from the mined content source by using a particular topic generation model; operation 103, performing, for each extracted at least one topic dimension vector, topic sentence mining on the content source according to the topic dimension vector, to obtain topic sentences corresponding to the topic dimension vector; and operation 104, splicing and synthesizing the topic sentences corresponding to the at least one topic dimension vector, to generate an article conforming to the requirement information.

The computer-readable storage medium may use any combination of one or more readable media. The readable medium may be a readable signal medium or a readable storage medium. The readable storage medium may be, for example but not limited to, an electrical, magnetic, optical, electromagnetic, infrared, or semiconductor system, apparatus, or device, or any combination thereof. More specific examples (a non-exhaustive list) of the readable storage medium include an electrical connection having one or more wires, a portable disk, a hard disk, a RAM, a ROM, an erasable programmable read-only memory (EPROM or flash memory), an optical fiber, a portable compact disk read-only memory (CD-ROM), an optical storage medium, a magnetic storage medium, or any appropriate combination thereof.

Figure 6:
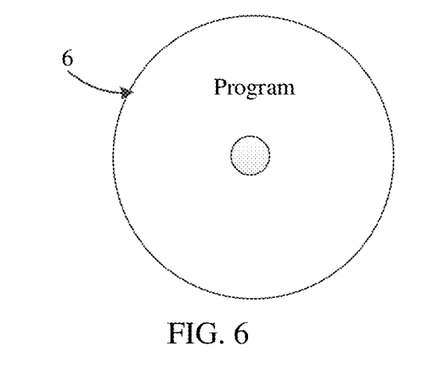
FIG. 6 is a schematic diagram of a computer-readable storage medium for article generation based on artificial intelligence according to an implementation of the present invention.

FIG. 6 is a schematic diagram of a computer-readable storage medium for article generation based on artificial intelligence according to an implementation of the present invention.

As shown in FIG. 6, a computer-readable storage medium 3 according to an implementation of the present invention is described, which may be a CD-ROM and include program code, and may be run on a computer device, such as a personal computer. However, the computer-readable storage medium in the present invention is not limited thereto. In this specification, the readable storage medium may be any tangible medium including or storing a program, and the program may be used by or used in combination with an instruction execution system, apparatus, or device.

The program code used for executing the operations of the present invention may be written by using one or more programming languages or a combination thereof. The programming languages include an object-oriented programming language such as Java and C++, and also include a conventional procedural programming language such as "C" or similar programming languages. The program code may be completely executed on a user computing device, partially executed on a user device, executed as an independent software package, partially executed on a user computing device and partially executed on a remote computing device, or completely executed on a remote computing device or server. In a case involving a remote computing device, the remote computing device may be connected to a user computing device through any type of network including a LAN or a WAN, or may be connected to an external computing device (for example, through the Internet by using an Internet service provider).

Figure 7:
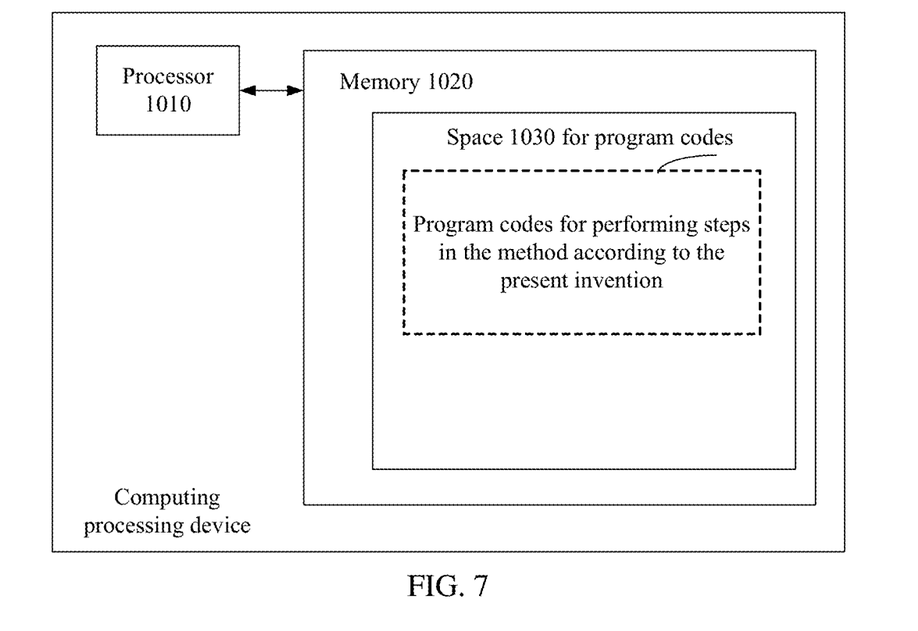
FIG. 7 is a schematic block diagram of a computing processing device configured to perform the method according to the present invention.
Figure 8:
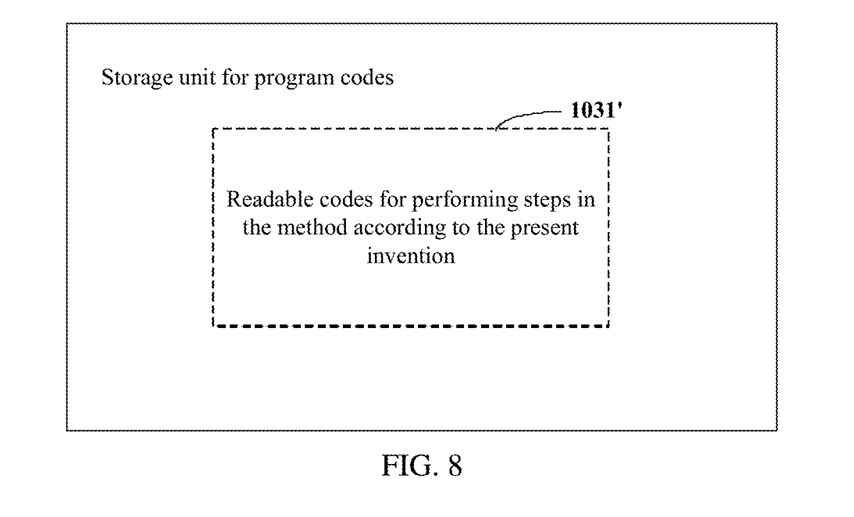
FIG. 8 schematically shows a storage unit configured to store or carry program codes for implementing the method according to the present invention.

For example, FIG. 7 shows a computing processing device that can implement the method for establishing an enterprise group according to the present invention. The computing processing device is, for example, the foregoing server or client. The computing processing device conventionally includes a processor 1010 and a computer program product or a machine readable medium in the form of a memory 1020. The memory 1020 may be an electronic memory such as a flash memory, an electrically erasable programmable read-only memory (EEPROM), an erasable programmable read-only memory (EPROM), a hard disk, and a read-only memory (ROM). The memory 1020 has a storage space 1030 for program codes (instructions) 1031 for performing any method step in the foregoing method. For example, the storage space 1030 for program codes may include various program codes 1031 for implementing various steps in the foregoing method separately. These program codes may be read from one or more computer program products or written into the one or more computer program products. These computer program products include a program code medium such as a hard disk, a compact disc, a memory card or a floppy disk. Such a computer program product is usually a portable or fixed storage unit as shown in FIG. 8. The storage unit may have storage segments, storage spaces, and the like arranged similarly to the memory 1020 in the computing processing device in FIG. 7. Generally, the storage unit includes computer readable codes 1031', that is, codes that can be read by a processor such as the processor 1010. When these codes are run by the computing processing device, the computing processing device performs the steps in the method described above.

Although the operations of the method in the present invention are described according to the specific order in the accompanying drawings, this does not require or imply that the operations have to be performed in the specific order, or all the operations shown have to be performed to achieve an expected result. Additionally or alternatively, some operations may be omitted, and a plurality of operations are combined into one operation to be performed, and/or one operation is divided into a plurality of operations to be performed.

Although the spirit and principles of the present invention are described with reference to several specific embodiments, it should be understood that the present invention is not limited to the disclosed specific embodiments, and the division of each aspect does not mean that the features in the aspects cannot be combined for benefit. The division is only for the convenience of description. The present invention is intended to cover various modifications and equivalent arrangements included within the spirit and scope of the appended claims.

The invention claimed is:

1. An article generation method comprising:
   mining a content source based on requirement information inputted by a user;
   extracting at least one topic dimension vector from the mined content source by using a particular topic generation model;
   performing topic sentence mining on the content source according to the topic dimension vector for each extracted topic dimension vector, to obtain topic sentences corresponding to the topic dimension vector; and
   splicing and synthesizing the topic sentences corresponding to the at least one topic dimension vector, to generate an article conforming to the requirement information,
   wherein the splicing and synthesizing of the topic sentences corresponding to the at least one topic dimension vector comprises:
   screening the topic sentences corresponding to each said topic dimension vector according to a topic core word and/or a particular sentiment analysis algorithm; and
   splicing and synthesizing the topic sentences reserved after the screening.

2. The method according to claim 1, wherein the mining a content source based on requirement information inputted by a user comprises:
   parsing the requirement information to obtain an article description object and/or condition information;
   mining a point of interest matching the article description object and/or the condition information; and
   determining user generated content corresponding to the point of interest as the content source.

3. The method according to claim 2, wherein the parsing the requirement information comprises at least one of the following operations:
   performing word segmentation on the requirement information;
   performing part-of-speech analysis on the requirement information;
   performing named entity recognition on the requirement information; and
   performing semantic normalization processing on the requirement information.

4. The method according to claim 2, wherein the determining user generated content corresponding to the point of interest as the content source comprises:
   obtaining a user score of each point of interest in a plurality of point of interests matching the article description object and/or the condition information;
   selecting, according to the user score of each point of interest, a target point of interest meeting a particular selection condition from the plurality of point of interests; and
   determining user generated content corresponding to the target point of interest as the content source.

5. The method according to claim 1, wherein the extracting at least one topic dimension vector from the mined content source by using a particular topic generation model comprises:
   extracting, through the particular topic generation model, at least one topic description word from user generated content comprised in the content source; and
   transforming the extracted topic description word into the at least one topic dimension vector through a first word vector transformation model.

6. The method according to claim 1, wherein the performing topic sentence mining on the content source according to the topic dimension vector, to obtain topic sentences corresponding to the topic dimension vector comprises:
   performing a sentence segmentation and/or filtering operation on user generated content in the content source, to obtain one or more candidate topic sentences corresponding to the topic dimension vector;
   calculating a cosine similarity between a sentence vector of each candidate topic sentence and the topic dimension vector; and
   determining a candidate topic sentence of which the calculated cosine similarity conforms to a threshold as a topic sentence corresponding to the topic dimension vector.

7. The method according to claim 6, wherein the calculating a cosine similarity between a sentence vector of each candidate topic sentence and the topic dimension vector comprises:
   performing word segmentation processing on the candidate topic sentence to obtain a word segmentation result corresponding to the candidate topic sentence;
   transforming the word segmentation result into a sentence vector through a second word vector transformation model; and
   calculating a cosine similarity between the transformed sentence vector and the topic dimension vector.

8. The method according to claim 1, wherein the screening of the topic sentences corresponding to each topic dimension vector according to a topic core word comprises:
   performing, for any topic sentence corresponding to the topic dimension vector, dependency semantic analysis on the topic sentence to obtain a topic core word of the topic sentence;
   determining whether the topic core word of the topic sentence belongs to the topic dimension vector corresponding to the topic sentence; and
   reserving the topic sentence in a case that the topic core word of the topic sentence belongs to the topic dimension vector corresponding to the topic sentence; otherwise, filtering out the topic sentence.

9. The method according to claim 1, wherein the screening of the topic sentences corresponding to each topic dimension vector according to a particular sentiment analysis algorithm comprises:
- determining, for any topic sentence corresponding to the topic dimension vector, a sentiment tendency score of the topic sentence by using the particular sentiment analysis algorithm;
- determining whether sentiment of the topic sentence is positive according to the sentiment tendency score of the topic sentence; and
- reserving the topic sentence in a case that the topic core word of the topic sentence belongs to the topic dimension vector corresponding to the topic sentence; otherwise, filtering out the topic sentence.

10. The method according to claim 1, wherein the splicing and synthesizing the topic sentences corresponding to the at least one topic dimension vector comprises:
- determining idea associations between the topic sentences and the corresponding topic dimension vector;
- selecting, according to the idea associations between the topic sentences and the corresponding topic dimension vector, a core topic sentence from the topic sentences corresponding to each topic dimension vector; and
- splicing and synthesizing the core topic sentences.

11. The method according to claim 10, wherein the determining idea associations between the topic sentences and the corresponding topic dimension vector comprises:
- determining the idea associations between the topic sentences and the corresponding topic dimension vector through a recurrent neural network and/or a TextRank algorithm.

12. The method according to claim 1, wherein before the splicing and synthesizing the topic sentences corresponding to the at least one topic dimension vector, the method further comprises:
- performing, by using match making rating, deduplication processing on the obtained topic sentences corresponding to each topic dimension vector.

13. The method according to claim 12, further comprising:
- selecting image information correlated with the at least one topic dimension vector from a particular image library; and
- fusing the image information and the generated article to form an image-text mixed article.

14. The method according to claim 1, further comprising:
- searching for a particular object attribute and/or sentence corpus matching content of the generated article or the requirement information; and
- generating an article title according to a particular template rule by using the found particular object attribute and/or sentence corpus.

15. An article generation device, comprising:
one or more processors;
a memory; and
a program stored in the memory, the program, when executed by the one or more processors, causing the one or more processors to perform the following operations, comprising:
- mining a content source based on requirement information inputted by a user;
- extracting at least one topic dimension vector from the mined content source by using a particular topic generation model;
- performing topic sentence mining on the content source according to the topic dimension vector for each extracted topic dimension vector, to obtain topic sentences corresponding to the topic dimension vector; and
- splicing and synthesizing the topic sentences corresponding to the at least one topic dimension vector, to generate an article conforming to the requirement information,
wherein the splicing and synthesizing of the topic sentences corresponding to the at least one topic dimension vector comprises:
- screening the topic sentences corresponding to each said topic dimension vector according to a topic core word and/or a particular sentiment analysis algorithm; and
- splicing and synthesizing topic sentences reserved after the screening.

16. The device according to claim 15, wherein the mining a content source based on requirement information inputted by a user comprises:
- parsing the requirement information to obtain an article description object and/or condition information;
- mining a point of interest matching the article description object and/or the condition information; and
- determining user generated content corresponding to the point of interest as the content source.

17. The device according to claim 16, wherein the parsing the requirement information comprises at least one of the following operations:
- performing word segmentation on the requirement information;
- performing part-of-speech analysis on the requirement information;
- performing named entity recognition on the requirement information; and
- performing semantic normalization processing on the requirement information.

18. The device according to claim 16, wherein the determining user generated content corresponding to the point of interest as the content source comprises:
- obtaining a user score of each point of interest in a plurality of point of interests matching the article description object and/or the condition information;
- selecting, according to the user score of each point of interest, a target point of interest meeting a particular selection condition from the plurality of point of interests; and
- determining user generated content corresponding to the target point of interest as the content source.

19. A non-volatile, non-transitory readable storage medium storing a program, the program, when executed by a processor, causing the processor to perform the method according to claim 1.

* * * * *